Feb. 9, 1937.  J. S. PECKER ET AL  2,069,846
MOUNTING MECHANISM FOR ROTATIVE AIRCRAFT SUSTAINING WINGS
Original Filed Aug. 31, 1931   3 Sheets-Sheet 3
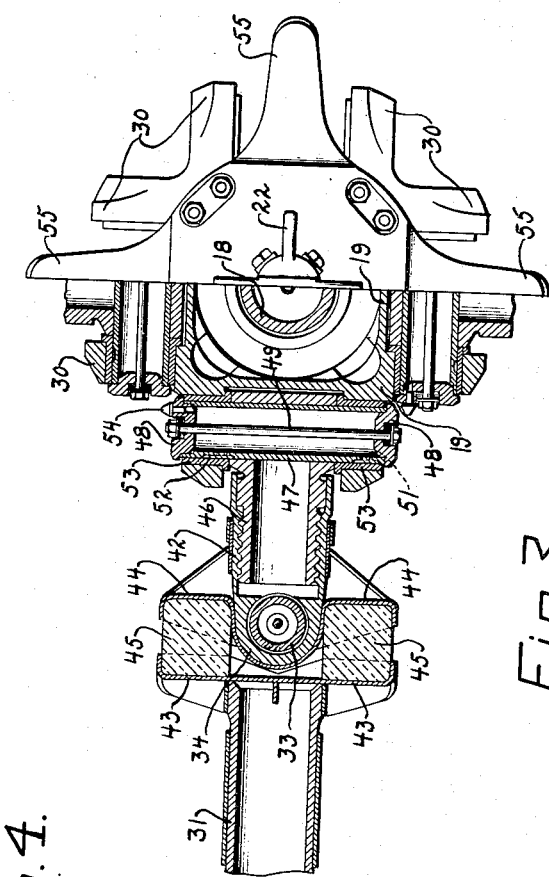

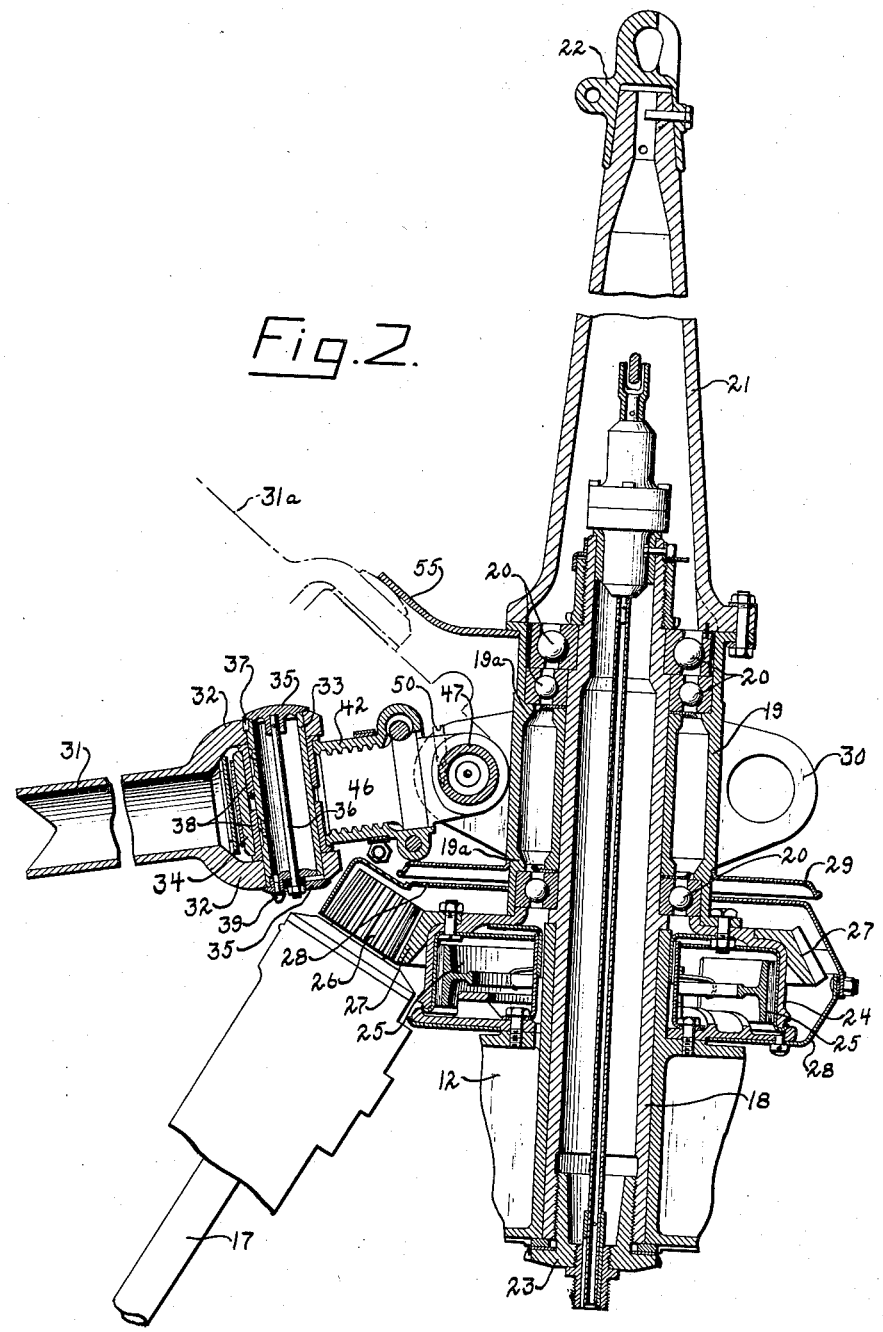

Patented Feb. 9, 1937

2,069,846

UNITED STATES PATENT OFFICE 2,069,846

MOUNTING MECHANISM FOR ROTATIVE AIRCRAFT SUSTAINING WINGS

Joseph S. Pecker, Philadelphia, and Agnew E. Larsen, Huntingdon Valley, Pa., assignors to Autogiro Company of America, Willow Grove, Pa., a corporation of Delaware Original application August 31, 1931, Serial No. 560,314. Divided and this application May 8, 1934, Serial No. 724,470

2 Claims. (Cl. 244—18)

This invention relates to improvements in mounting mechanism for rotative aircraft sustaining wings, and the invention is especially concerned with rotative wings normally adapted to be driven by relative air-flow in flight and having pivot joints for attaching the wings to a central hub structure so as to permit freedom for force compensating movements under the influence of variations in flight forces.

More specifically, some of the important features of the invention are involved in the use of cooperating wing pivot parts so arranged as to maintain the total size and weight of the parts at a minimum and even permit substantial reduction in such size and weight for a given size craft. Another important object relates to an effective and simple lubrication means for the articulations or pivots for the wings. Still further, the invention contemplates an improved mechanism for controlling movements of the wings about their pivots.

In addition to all the foregoing, the arrangement of the several parts, as will appear more fully as this description proceeds, is such as to afford adequate strength and minimum air resistance and, further, to cooperate neatly with other parts of a rotor hub or head assembly, so as to provide a compact and relatively small sized hub unit.

Other objects and advantages will appear more fully after a consideration of the accompanying drawings, illustrating a preferred embodiment of the invention, in which—

Figure 2 is a vertical sectional view through the rotor head assembly and certain of the associated blade or wing pivot arrangements, which parts are constructed in accordance with this invention;

Figure 3 is a top view, partly in elevation and partly in horizontal section, of portions of the mechanism shown in Figure 2; and Figure 4 is an enlarged detail view of a pivot part preferably employed.

Figure 1:
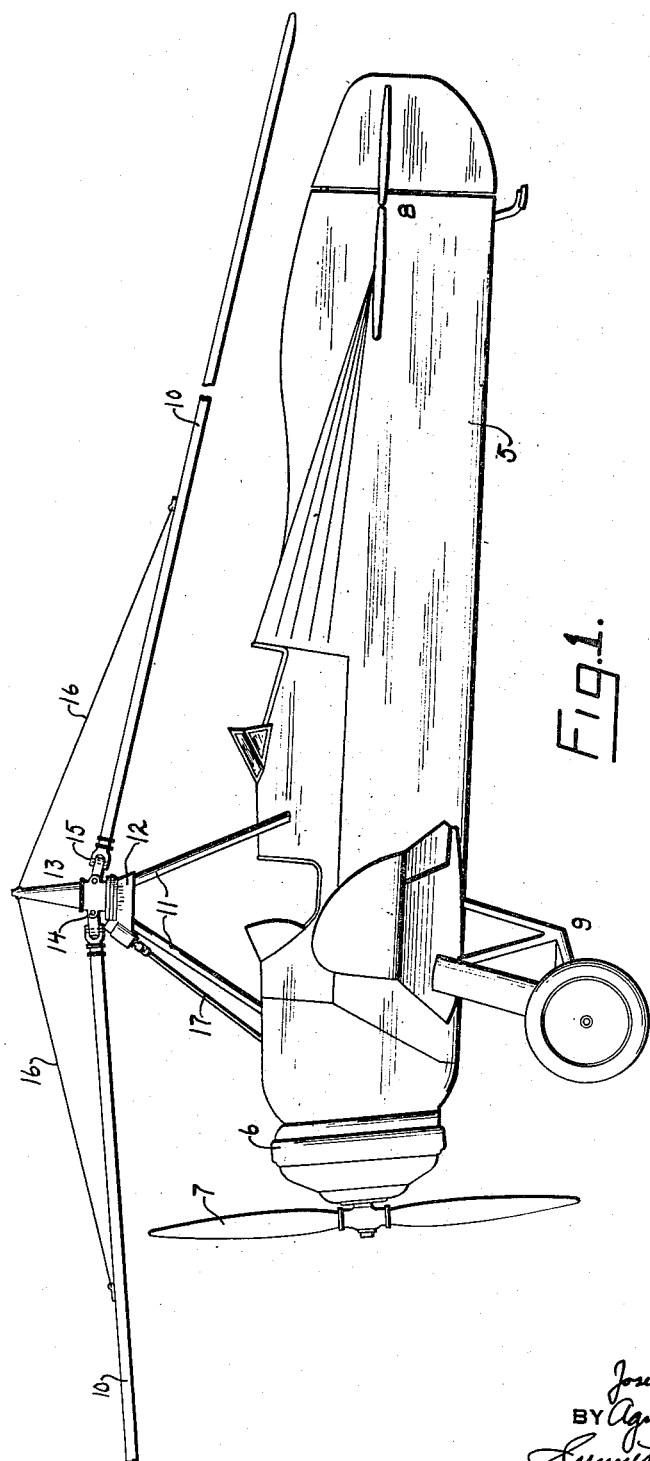
Figure 1 is a somewhat diagrammatic side elevational view of an aircraft of the rotative sustaining wing type, with the improvements of the present invention applied thereto.

Before considering the drawings, attention is directed to the fact that the present application is a division of our copending application Serial No. 560,314, filed August 31, 1931, now Patent No. 2,017,105, issued October 15, 1935.

The general features of the craft, as shown in Figure 1, are substantially as follows. The fuselage is designated by the numeral 5, and the side view of Figure 1 also includes a showing of an engine 6 driving propeller 7, an empennage structure 8 and landing gear 9.

The sustaining rotor, comprising a plurality of blades 10, is mounted above the body of the craft in any suitable manner as by means of the pylon posts 11 joined at their upper ends in an apex member 12, which serves more or less directly to support the hub structure generally indicated at 13. The blades or wings 10 are pivoted or articulated to the hub structure on two different axes 14 and 15, the first of which extends generally horizontally and the latter of which extends in an upright direction. Blade supporting members, such as cables 16, may be employed in order to restrain the blades as against excessive downward swinging movement when they are at rest or not rotating at flight speeds. The general arrangements of the craft may also include a mechanism for initiating rotation of the rotor prior to take-off from the ground and, for this purpose, in Figure 1 a drive shaft 17 is shown extended upwardly from the engine to the rotor hub.

The various features of the rotor head or hub construction, including the blade articulations or pivots, will appear to better advantage from inspection of Figures 2 and 3. In these views, the rotor head support at the top of the pylon is shown at 12. The member 12 has a central aperture or socket adapted to receive the spindle 18, and this spindle is extneded upwardly somewhat above the member 12 so as to provide a support for the hub member proper 19. The hub member surrounds the spindle and radial and thrust bearings 20 are inserted therebetween to ensure free operation. A top cone-shaped element 21 is secured to the hub member 19 and at its upper end is equipped with a fitting having apertured lugs 22 serving as attachment means for the blade supporting cables or the like 16 shown in Figure 1.

At its lower end the central spindle 18 may be provided with a flanged nut 23 threaded internally of the spindle and adapted to engage the lower side of the support 12 so as to transmit the thrust of sustension of the craft from the hub and its bearings, through the spindle 18 to the fixed support 12 and from there through the pylon supporting elements 11 to the body of the craft.

The rotor head assembly may also include a drum-like structure 24 secured to the hub member 19 toward the lower end thereof and adapted to cooperate with a brake mechanism generally indicated at 25, which may be employed to retard rotation of the rotor after a landing has been made. Additionally, the starter mechanism, including the shaft 17, is arranged to impart the rotative torque to the hub member by means of pinion 26 meshing with ring gear 27 carried externally of the drum 24. The rotating starter and brake parts are also preferably enclosed in a casing or housing shown in Figure 2 at 28. The casing 28 is fixed, but an additional casing element 29 carried by the hub and overlying at least the central region of the casing 28, rotates during rotor operation. The two casing parts together constitute an effective means for preventing entrance of moisture, dirt or the like.

For the purposes of attaching the wings or blades to the hub member 19, this member carries pairs of opposed and apertured lugs 30 which, in the embodiment shown, are disposed in such manner that the lugs of opposite pairs are arranged substantially in alignment with each other and substantially tangentially to the hub 19. This lug arrangement, as will be seen in Figure 2, results in the disposition of at least a portion of the several lugs adjacent to the internal hub reenforcements 19a—19a, which is of importance for structural reasons, especially effective distribution and transmission of flight forces and thrusts through the hub member and its bearings to the central spindle.

The structure employed for the attachment of the blades or wings to the hub will further be seen to include a root end fitting or the like 31 which is provided with a forked end 32—32, each portion of the fork being apertured to receive the pivot member 33. The parts 32—32 embrace an additional joint part 34 which is also apertured to receive the pin or pivot part 33. These parts are those which are embodied or incorporated in the pivot structure indicated generally and somewhat diagrammatically by the numeral 15 in Figure 1.

In accordance with this invention, the pivot member 33 is fixedly mounted within the fork 32—32, cap members 35—35, tie bolt 36 and pin 37 being provided for this purpose. The movement of this joint, therefore, takes place between the member 32 and the pivot 33 and, if desired, bearing bushings 38 may be interposed between these relatively movable joint parts.

By constructing the joint 32, 33 and 34 in the manner just described, the load imposed upon the bearing may be distributed over relatively extensive bearing surfaces. This is advantageous, of course, in reducing wear as well as in permitting reduction in the width and weight of the forked parts.

Another feature of considerable importance in connection with the blade articulation just described is involved in the arrangement of the pivot pin 33 as a lubricant reservoir. This reservoir is preferably of such capacity as to contain a charge of grease sufficient to lubricate the bearing surfaces associated with the pin 33 from the time of one general rotor inspection to another. A convenient fitting, in the nature of a one-way valve 39, may be disposed in one of the cap members 35, so that the reservoir may readily be charged by the application of a pressure gun. The lubricant is fed from the interior of the pin 33 to the bearing surfaces at the outer cylindrical wall of this pin through ducts 40 and grooves 41 (see Figure 4). As seen in this figure, as well as in Figure 2, the grooves 41 are extended within the high pressure area incident to the action of centrifugal force during rotation of the rotor. In addition, the distributing grooves are preferably extended about the pin 33 throughout an arc preferably approximately equal to that defined by the limits of blade swinging movements under the influence of normal irregularities in flight forces. In this way, the zone or area of highest pressure is always effectively supplied with lubricant. It is further to be observed that the arrangement of the pin 34 and the immediately cooperating members is such that the lubricant will be fed from the reservoir, to the high pressure area, under the influence of centrifugal force. This, of course, is also of considerable importance since it provides a very constant and effective feed of the lubricant.

In order to provide for control of certain blade movements about the pivots 33, the blade root 31 and the joint part 42, for each blade, may conveniently be provided with opposed bracket members 43 and 44 at each side of the axis of this joint. A resilient device, such as the rubber block 45, may be inserted between the opposed brackets of each pair in the manner clearly shown in Figure 3. Preferably, the brackets and the resilient blocks are so constructed as to normally maintain the blocks under at least a slight compression, and these blocks will therefore yieldingly resist any relative angular movement of the blade root 31 and the joint part 42.

From inspection of Figures 2 and 3, it will be seen that the joint part 42 is rigid with the member 34 which is apertured to receive pin 33 and, further, that the part 42 is cylindrical and internally threaded to cooperate with an externally threaded member 46. The members 42 and 46, therefore, may be employed as a means of adjustment of the incidence of the individual wings, the action of such an arrangement being more fully described and illustrated in the copending application of Joseph S. Pecker, Serial No. 567,343, filed October 17th, 1931, now Patent No. 1,995,460, issued March 26, 1935. Since this incidence adjustment mechanism forms no part of the present invention per se, no detailed description thereof is included herein.

Toward its inner end, the member 46 is provided with a transverse aperture through which the pivot 47 is extended. This pivot serves to connect a blade with a pair of apertured lugs 30—30 of the hub 19 and the parts may be retained in their proper operative positions by means of cap members 48—48, tie bolt 49 and the set screw 50. As will be apparent from comparison of Figures 1, 2 and 3, the joint structure 46, 47 and 30—30 serves to pivot a blade to the hub structure on a substantially horizontally extended axis as diagrammatically indicated at 14 in Fig. 1.

Similarly to the pin 33, the pin 47 is also formed as a reservoir for grease which may be fed through ducts or passages 51 and grooves 52 to the bearing surfaces between the bushings 53 and the outer surface of the pin 47. A pressure gun fitting 54 may also be provided in one of the cap members 48. The set screw 50 serves to fixedly position the pin 47 with respect to the joint part 46, so that the grease grooves 52 will be retained in the high pressure zone.

Stops for extreme or abnormal upward swinging movements of the blades are provided on the hub structure and these take the form of spring elements 55, one being positioned over each blade. The action of these stops is clearly indicated in Figure 2 by the dot and dash line showing 31a of a blade root pivoted upwardly, in which position it will be seen that the spring 55 contacts with the cap or closure member 35 for the pivot pin 33. It will be understood that these stops serve no function in normal operation of the craft either on the ground or in flight, although they yieldingly cushion abnormal upward movements of the blades which may be caused, for example, by gusts of wind when the rotor is standing idle when the ship is on the ground. At this point it is also to be observed that the full line showing of the blade root in Figure 2 illustrates the lower limit of movement on the horizontal articulation 47. Thus, while relatively great freedom for upward and downward swinging movement is provided, the various parts of the blade articulations and the adjacent devices associated with the rotor hub, such as the brake and starter, are arranged in a relatively compact manner. Note that the positioning of the pivots 33 and 47 is such that the starter pinion 26 lies between the two pivots. This is of importance in obtaining the necessary clearances while at the same time providing for the mounting of the blades and starter parts in horizontal planes which are quite close to each other.

The structure above described is advantageous, in general, since all the various parts (including the main rotor bearings, the blade pivot lugs and pivot joints, the brake parts and associated rotor driving mechanism), are all relatively arranged so as to produce a much more compact rotor head structure than obtained heretofore. This, of course, reduces parasite drag, head resistance and skin friction to a minimum and, it should be observed that, in addition to the foregoing, very great strength is provided even though the parts, for a machine of given size, are relatively small and light in weight.

Still further, the relatively wide spacing of the blade attaching lugs 30—30 permits relatively light construction thereof, since by increasing the resisting moment arm the strains and thrusts of operation (especially during blade swinging movements) which are transmitted to the hub, are materially reduced.

Various of the individual blade pivot joints, furthermore, are also arranged advantageously to distribute bearing loads over relatively large bearing surfaces. The size and weight of these parts, therefore, may also be reduced in a structure adapted for use in connection with a craft of given size.

A novel and highly desirable type of lubrication for the blade articulations is also provided, it being particularly advantageous in permitting convenient renewal of the lubricant at the periodic times of rotor head inspection and lubrication. The lubrication arrangement is also of advantage as it provides for automatic feed, under the action of centrifugal force, to the high pressure areas of both the horizontal as well as the vertical pins.

Finally, the general appearance of the rotor head is considerably enhanced, it being noted in this connection that the various parts are compact and of small overall dimensions and are also well covered to present a neat external appearance.

We claim:—

1. In an aircraft sustaining rotor, an axis mechanism, and a lubricant-containing pivot pin joining a blade of the rotor to the axis mechanism, whereby the blade may swing about the axis of the pin under the influence of irregularities in flight forces, the pin having a groove extending generally axially and diagonally of the pin and being in communication with the interior thereof, the diagonal extension being sufficient to traverse an arc approximating that defined by blade swinging movements during normal flight operation, the groove being located in the high pressure area of the pin set up as a result of the action of centrifugal force incident to rotation of the rotor, and said groove serving to deliver and distribute lubricant from the interior of the pin to said high pressure area under the influence of said centrifugal force.

2. In an aircraft sustaining rotor of the pivoted blade type, a mounting structure for the blades with apertured lug means, link means for attaching a blade to the mounting structure, a lubricant-containing pivot pin fixedly mounted in the link means and rotatively mounted in a lug aperture and providing movement of the blade transverse the plane of rotation, additional apertured lug means at the blade root, a similar lubricant-containing pivot pin rotatively mounted in the link means and fixed in the lug means of the blade providing for movement of the blade in the plane of rotation, each pivot pin having a groove extending generally axially and diagonally of the pin and being in communication with the interior thereof, the diagonal extension being sufficient to traverse an arc approximating that defined by blade swinging movements during normal flight operation, the groove being located in the high pressure area of the pin set up as a result of the action of centrifugal force incident to rotation of the rotor, said grooves serving to deliver and distribute lubricant from the interior of the pins to the high pressure areas thereof under the influence of said centrifugal force.

JOSEPH S. PECKER.
AGNEW E. LARSEN.